United States Patent [19]

Constien

[11] 3,992,357

[45] Nov. 16, 1976

[54] POLYCARBONATES INCORPORATING 2-METHYLGLYCEROL RESIDUES

[75] Inventor: Vernon George Constien, Angleton, Tex.

[73] Assignee: The Dow Chemical Company, Midland, Mich.

[22] Filed: May 13, 1974

[21] Appl. No.: 469,204

[52] U.S. Cl. .............................. 260/47 XA; 260/49
[51] Int. Cl.$^2$ .......................................... C08G 63/62
[58] Field of Search .............................. 260/47 XA

[56] References Cited
UNITED STATES PATENTS

| | | | |
|---|---|---|---|
| 3,141,863 | 7/1964 | Holm | 260/47 XA |
| 3,248,416 | 4/1966 | Stevens | 260/47 XA |
| 3,875,112 | 4/1975 | Bockmann et al. | 260/77.5 D |

FOREIGN PATENTS OR APPLICATIONS

| | | | |
|---|---|---|---|
| 2,119,775 | 11/1972 | Germany | 260/47 XA |
| 942,538 | 11/1963 | United Kingdom | 260/47 XA |
| 885,442 | 12/1961 | United Kingdom | 260/47 XA |

*Primary Examiner*—Wilbert J. Briggs, Sr.
*Attorney, Agent, or Firm*—Benjamin G. Colley

[57] ABSTRACT

A thermoplastic polycarbonate formed by reacting a carbonyl halide such as phosgene, a dihydric phenol, and a 2-methyl glycerol residue-dihydric phenol prepolymer under polycarbonate forming conditions.

5 Claims, No Drawings

POLYCARBONATES INCORPORATING 2-METHYLGLYCEROL RESIDUES

BACKGROUND OF THE INVENTION

This invention relates to copolycarbonates having a 2-methyl glycerol residue incorporated therein.

It is known from U.S. Pat. Nos. 3,136,741 and 3,161,615 to make polycarbonate copolymers by reacting 4,4'-dihydroxy diphenyl methanes with phosgene and various glycols such as ethylene glycol, butane glycol, and hexane glycol.

It is also known from U.S. Pat. No. 3,220,973 to use glycerine, trimethylolpropane, pentaerythritol, etc. in place of the above glycols to prepare crosslinked polycarbonates.

It is also known from Ser. No. 374,058, filed June 29, 1973, that copolycarbonates can be prepared having an epihalohydrin residue incorporated therein, however these have the disadvantage that they crosslink upon heating to about 240° C. and thus cannot be used in a standard molding apparatus.

SUMMARY OF THE INVENTION

It now has been discovered that random copolycarbonates can be prepared from a dihydric phenol, a carbonyl halide, and a 2-methyl glycerol residue-dihydric phenyl precursor and these copolycarbonates are similar in physical properties to the known bisphenol polycarbonates, i.e. the homopolycarbonates of U.S. Pat. No. 3,028,365, but the present polycarbonates are superior in that they have a higher oxygen index. This is most unexpected since the present thermoplastic copolymer has free aliphatic hydroxyl groups and ether oxygens on the polymer chains which one would expect to contribute to the combustion of the copolymer and give a lower rather than a higher oxygen index.

It is well known in the prior art that polymers in general and polycarbonates in particular can be made to have a higher oxygen index by the incorporation therein of halogenated polymerizable monomers or halogenated non-polymerizable additives.

Other additives that have been used include organophosphorus compounds and organosiloxanes.

The present invention has the advantage that the use of fire retardant additives is eliminated since the polycarbonates of this invention have an oxygen index which is substantially equal to the prior art modified polycarbonates without the necessity of adding the fire retardant additives. When the present polycarbonates do burn, hydrogen chloride and hydrogen bromide and the like are not part of the noxious gases released. This is an important advantage since it is well known that noxious gases can be hazardous to life and property in a fire situation.

The present invention is broadly the linear thermoplastic polycarbonate which comprises the reaction product under polycarbonate forming conditions of a carbonyl halide, a dihydric phenol and a polyhydroxy compound or prepolymer of the formula HO—B+O—CH$_2$—C(CH$_3$)(OH)—CH-
$_2$—O—B—O—CH$_2$—C—((CH$_3$)(OH)—CH-
$_2$—O—B+$_n$OH wherein B is the divalent residue from a dihydric phenol and n is a whole number from 1 to 5 and averages from about 1 to about 3.0.

A preferred aspect of the present invention is a random polycarbonate having about 2 to about 60 weight percent of the above prepolymer units connected by carbonate linkages with about 40 to about 98 weight percent of the above dihydric compound. A particularly preferred polycarbonate has about 5 to about 25 weight percent prepolymer units with the remainder being about 95 to about 75 weight percent of the above dihydric compound.

A more preferred aspect of the present invention is a polycarbonate which is the reaction product under polycarbonate forming conditions of phosgene, a dihydroxy compound of the formula HO—B—OH and a polyhydroxy compound or prepolymer of the formula HO—B+O—CH$_2$—C(CH$_3$)(OH)—CH-
$_2$—O—B—O—CH$_2$—C(CH$_3$)(OH)—CH-
$_2$—O—B+$_n$OH wherein B is the divalent group

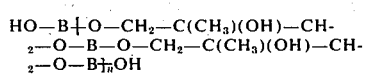

and R$_1$ and R$_2$ are independently hydrogen and lower alkyls such as methyl, ethyl, propyl, butyl and n is a whole number from one to five.

The process by which the polycarbonates of this invention are prepared consists of forming a prepolymer from one mole of a dihydric phenol with about 0.005 to about 0.23 moles of a di(2-methylglycidyl)ether of Bis A. This prepolymer is then reacted with additional amounts of the same or a different dihydric phenol and a carbonyl halide under polycarbonate forming conditions such as interfacial polycondensation or transesterification to produce a linear thermoplastic polycarbonate.

These polycarbonate resins are useful in that they can be injection molded and extruded into useful objects by conventional methods.

The resins of this invention have a weight average molecular weight greater than about 20,000 and preferably in the range from about 22,000 to about 65,000 as measured by gel permeation chromatography.

DETAILED DESCRIPTION

The polycarbonates produced in this invention are made by the use of 2-methyl glycerol type compounds which are the reaction products of 2-methylhalohydrin with Bis A, i.e. di(2-methylglycidyl)ether of 2,2-bis(4-hydroxy phenyl) propane having an epoxy equivalent weight range from about 195 to about 225 which is commercially available from Dainippon Ink and Chemicals, Inc. and is known as "Epiclon 800." The preparation of these reaction products is disclosed in U.S. Pat. No. 3,507,820.

A prepolymer is made by reacting about 0.005 to about 0.23 moles of the di 2-methyl glycidyl ether of Bis A with one mole of Bis A. The reaction is conducted in an excess of Bis A and in the presence of about 0.04 to about 0.11 percent by weight, based on the Bis A, of a phosphonium catalyst. The reactants are heated to a temperature ranging from 150° to 170° C. for about 2 to about 6 hours.

Examples of the phosphonium catalysts that can be used are ethyltriphenyl phosphonium acetate, ethyl triphenyl phosphonium iodide, ethyltriphenyl phosphonium bromide, benzyltriphenyl phosphonium bromide, and the like.

The above prepolymer is recovered and dissolved in a halogenated solvent such as methylene chloride to which is added about 0.003 to 0.01 moles of a chain stopper such as phenol or an alkylated phenol and about 1.1 to about 1.6 moles of aqueous sodium hydroxide, both based on the equivalents of phenolic hydroxy in the prepolymer.

The solution is then vigorously stirred and about 0.3 to 3.0 percent by weight, based on prepolymer, of a quaternary amine or a tertiary amine catalyst is added and the phosgene is added (about 0.5 to 1.0 moles per equivalent phenolic hydroxyl) while keeping the temperature at 20°–40° C. until the pH of the solution is 6–7.

After phosgene addition is stopped and the halogenated solvent layer is recovered and washed several times with deionized water, the polycarbonate is recovered by precipitation into acetone, filtered, washed, and dried.

The dihydric phenols employed in the practice of this invention are known dihydric phenols in which the sole reactive groups are the two phenolic hydroxyl groups. Some of these are represented by the general formula

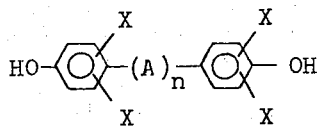

wherein A is a divalent hydrocarbon radical containing from 1–15 carbon atoms, —S—, —S—S—

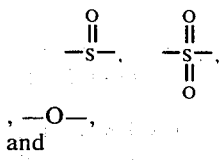

, —O—, and $$-\overset{O}{\underset{\|}{C}}-,$$

X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons and an oxyaryl group of 6–8 carbons and n is 0 or 1.

One group of suitable dihydric phenols are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)pentane
2,2-bis(3,5-difluoro-4-hydroxyphenyl)butane
2,2-bis(4-hydroxyphenyl)propane (Bis A)
1,1-bis(3-methyl-4-hydroxyphenyl)ethane
1,1-bis(4-hydroxyphenyl)methane Another group of dihydric phenols useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide Another group of dihydric phenols which may be used in the practice of the invention includes the dihydroxyaryl sulfones such as, for example:
bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone Another group of dihydric phenols useful in the practice of the invention includes the dihydroxydiphenyls:
3,3'-5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether A further group of dihydric phenols outside the scope of the above generic formula which may be used in the practice of the invention includes the dihydroxy benzenes, and the halo- and alkyl-substituted dihydroxy benzenes, such as, for example, resorcinol, hydroquinone, 1,4-hydroxy-2-chlorobenzene, 1,4-dihydroxy-2-bromo-benzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propyl-benzene.

Other dihydric phenols of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The following examples are presented to further illustrate but not limit the invention.

EXAMPLE 1

To 630 grams (2.76 moles) of bisphenol A, 70 grams (0.16 moles) of Epiclon 800 (di-2-methylglycidylether of bisphenol A, EEW 214) was added and heated to 155° C. under a nitrogen atmosphere. After all the bisphenol A was dissolved, 0.35 grams of ethyltriphenylphosphonium acetate was added and the reactants were heated to 175° C. After cooking 5 hours, all epoxide had reacted and the product was flaked.

To 590 grams of the above prepolymer mixture with unreacted bisphenol A, 2400 ml. of methylene chloride and 5.5 grams of phenol were added under a $N_2$ atmosphere. To this solution 2010 grams of 10% NaOH was added and dissolved. With vigorous stirring, 6 cc of 60% benzyltrimethylammonium chloride was added and phosgene addition begun. After 168 minutes, the solution was pH 7 and phosgene addition was stopped. The methylene chloride layer was removed and washed three times. The product was recovered by precipitation by feeding the methylene chloride solution into acetone. The polymer was filtered out and dried under vacuum at 110° C. for one day.

The product is a polycarbonate copolymer containing approximately 40% bisphenol A-capped Epiclon 800 by weight having a weight average molecular weight of 38,000.

EXAMPLE 2

The procedure used in Example 1 to prepare the prepolymer was repeated except that the charge was changed to 1400 grams of bisphenol A, 155 grams Epiclon 800, and 1.0 gram of ethyltriphenylphosphonium acetate.

To 330.7 grams of this prepolymer, containing excess bisphenol A, 1450 ml. of methylene chloride, 0.7 grams of phenol, and 1462 grams of 10% NaOH were added and dissolved under a $N_2$ atmosphere. This solution was stirred vigorously and 8 cc of 60% benzyltrimethylammonium chloride added and phosgene addition begun. After 120 minutes the solution pH was 7 and phosgene addition was stopped. The methylene chloride layer was washed three times and the product was precipitated out in acetone. The copolymer was again water washed and then vacuum dried at 110° C.

The product is a polycarbonate copolymer containing approximately 20% bisphenol A-capped Epiclon 800 by weight having weight average molecular weight of 26,000.

EXAMPLE 3

The procedure used in Example 1 to prepare the prepolymer was repeated except the charge was changed to 1995 gm. parabisphenol A, 150 gm. of Epiclon 800, and 0.8 gm. of ethyltriphenylphosphonium acetate.

To 303 grams of this prepolymer, 1400 ml. of methylene chloride, 0.7 grams of phenol, and 1462 grams of 10% NaOH were added and dissolved under a $N_2$ atmosphere. This solution was stirred vigorously and 8 cc. of 60% benzyltrimethylammonium chloride added and phosgene addition began. After 121 minutes the solution pH was 7 and phosgene addition was stopped. The methylene chloride layer was washed three times and the product precipitated out in acetone. The product was again water washed and the vacuum dried at 110° C.

The product was a polycarbonate copolymer containing approximately 10% bisphenol A-capped Epiclon 800 by weight and having a weight average molecular weight of about 62,000.

TABLE I

Physical Properties of Examples 1, 2, 3

| Property | % Copolymers (by weight) | | | Lexan 101 |
|---|---|---|---|---|
| | Ex. 3 10% | Ex. 2 20% | Ex. 1 40% | |
| Yield Tensile strength (psi) | 8980 | 9000 | 9000 | 8900 |
| Ultimate tensile (psi) | 7990 | 7700 | 7900 | N.A. |
| Yield elongation (%) | 4.49 | 5.8 | 5.5 | 6.1 |
| Ultimate elongation (%) | 89 | 75 | 50 | N.A. |
| Izod impact (⅛") (ft.-lbs.) | 2.35 | 1.4 | 1.1 | 17.0 |
| Heat distortion temperature (annealed) (° C) | N.A. | 136 | 132 | 148 |
| Oxygen index (% $O_2$) (ASTM D-2863-70) | 32.0 | 35.5 | 29.5 | 25.5 |

What I claim is:

1. A linear thermoplastic polycarbonate which comprises a reaction product under polycarbonate forming conditions of
   1. a carbonyl halide,
   2. a dihydric phenol, and
   3. a prepolymer having the formula $$HO-B+O-CH_2-C(CH_3)$$
   $$_2-O-B-O-CH_2-C-(CH_3)$$
   $$_2-O-B\!\!+_n\!OH$$
   $$(OH)-CH-$$
   $$(OH)-CH-$$

wherein B is the divalent residue from a dihydric phenol and $n$ is 1–5 wherein the prepolymer comprises 2–60 weight percent of the polycarbonate.

2. The polycarbonate of claim 1 wherein the prepolymer comprises 5–25 weight percent of the polycarbonate.

3. The polycarbonate of claim 1 wherein the dihydric phenol has the formula

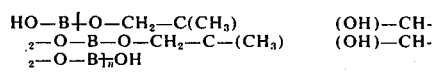

wherein A is a divalent hydrocarbon radical containing 1–15 carbon atoms, —S—, —S—S—,

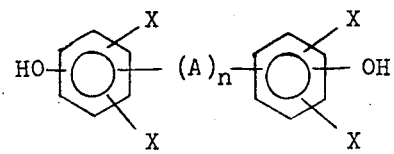

—O— or

X is independently hydrogen, chlorine, bromine, fluorine, or a monovalent hydrocarbon radical such as an alkyl group of 1–4 carbons, an aryl group of 6–8 carbons, an oxyalkyl group of 1–4 carbons or an oxyaryl group of 6–8 carbons and $n$ is 0 or 1.

4. The polycarbonate of claim 1 wherein the dihydric phenol has the formula

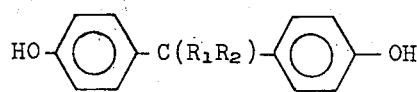

and the divalent residue B has the formula
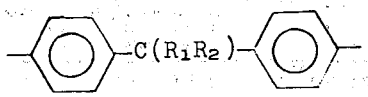
wherein $R_1$ and $R_2$ are independently hydrogen and lower alkyl groups of 1–4 carbons.
5. The polycarbonate of claim 1 wherein the dihydric phenol and the divalent residue B is 2,2-bis(4-hydroxyphenol)propane.
* * * * *